US007513456B2

(12) United States Patent
Lindahl

(10) Patent No.: US 7,513,456 B2
(45) Date of Patent: Apr. 7, 2009

(54) APPARATUS AND METHOD FOR REDUCED BACKLASH STEERING TILLER

(75) Inventor: Gary M Lindahl, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 681 days.

(21) Appl. No.: 11/128,810

(22) Filed: May 13, 2005

(65) Prior Publication Data

US 2006/0255555 A1 Nov. 16, 2006

(51) Int. Cl.
*B64C 25/50* (2006.01)
(52) U.S. Cl. ............. 244/50; 244/236; 244/100 R; 244/220; 244/99.3; 280/92
(58) Field of Classification Search ............ 244/50, 244/102 A, 103 S, 51, 99.2, 99.3, 100 R, 244/220, 232
See application file for complete search history.

(56) References Cited

U.S. PATENT DOCUMENTS

| | | | | | |
|---|---|---|---|---|---|
| 1,593,823 | A | * | 7/1926 | Gleason | 440/55 |
| 1,947,973 | A | * | 2/1934 | Davis | 137/625.24 |
| 1,993,549 | A | * | 3/1935 | Holmes | 114/144 R |
| 2,614,777 | A | * | 10/1952 | Henry et al. | 244/104 R |
| 2,626,116 | A | * | 1/1953 | Steuby | 244/103 W |
| 2,895,445 | A | * | 7/1959 | Foraker | 440/62 |
| 2,949,256 | A | * | 8/1960 | Stout | 244/50 |
| 3,211,400 | A | * | 10/1965 | Booth | 244/50 |
| 3,362,495 | A | * | 1/1968 | Lacey | 180/117 |
| 3,443,453 | A | * | 5/1969 | Thompson | 74/510 |
| 4,016,775 | A | | 4/1977 | Carlson | |
| 4,263,994 | A | * | 4/1981 | Hayes | 188/67 |
| 4,948,069 | A | * | 8/1990 | Veaux et al. | 244/50 |
| 5,042,749 | A | * | 8/1991 | Jacques et al. | 244/49 |
| 5,070,804 | A | * | 12/1991 | Strazzeri | 114/170 |
| 5,156,363 | A | * | 10/1992 | Cizewski et al. | 244/223 |
| 6,572,055 | B1 | * | 6/2003 | Bernard | 244/229 |
| 6,641,085 | B1 | * | 11/2003 | Delea et al. | 244/50 |

(Continued)

OTHER PUBLICATIONS

Kollar, Carl, Diverse Electronics Services, "Throttle Pot Box, H-Bridge Motor Controller, motor control, PWM," printed Jan. 6, 2005, pp. 1-3.

*Primary Examiner*—Michael R Mansen
*Assistant Examiner*—Brian M O'Hara
(74) *Attorney, Agent, or Firm*—Harness, Dickey & Pierce, P.L.C.

(57) ABSTRACT

A steering system for a mobile platform is provided that reduces and/or eliminates backlash in the steering system. The steering system includes an input mechanism for receiving an input from an operator of the mobile platform to move the input mechanism into a first position or a second position. The input mechanism further includes an input arm. An idler is rotatably coupled to the input, and the idler is configured to engage the input arm in the second position. A pair of biasing members is coupled to the idler and the input arm to bias the input mechanism to a "center" or "neutral" position. The biasing members are operable to resist the movement of the input mechanism into the first or second positions. A steering mechanism coupled to the input mechanism monitors the position of the input mechanism and generates electrical signals to drive a motor that steers a wheel in accordance with the direction of movement of the input mechanism.

6 Claims, 3 Drawing Sheets

U.S. PATENT DOCUMENTS

| | | | |
|---|---|---|---|
| 6,647,820 B2 * | 11/2003 | McKeown et al. | 74/471 XY |
| 6,715,438 B1 * | 4/2004 | Hundertmark | 114/144 R |
| 6,732,979 B1 * | 5/2004 | Kilner et al. | 244/236 |
| 6,804,892 B1 * | 10/2004 | Yung et al. | 33/286 |
| 7,207,579 B1 * | 4/2007 | Howard | 280/89.11 |
| 2006/0278755 A1 * | 12/2006 | Bachmeyer et al. | 244/50 |

* cited by examiner

APPARATUS AND METHOD FOR REDUCED BACKLASH STEERING TILLER

FIELD OF THE INVENTION

The present invention relates to steering systems for mobile platforms, and more particularly to a zero backlash steering tiller.

BACKGROUND OF THE INVENTION

Various mechanisms may be employed to guide mobile platforms. For example, in a commercial aircraft application, a nose wheel is generally employed to steer the aircraft upon landing. The nose wheel is most typically mechanically coupled to a nose gear. Generally, the nose gear is in turn coupled to a steering mechanism, such as a tiller, in the cockpit for receipt of an input from a pilot. Thus, as the input from the pilot is transferred to the nose gear from the tiller, the nose gear serves to move the nose wheel to guide the aircraft based on the input.

Generally, most tillers have at least a small degree of backlash which provides undesirable feedback to pilots while steering. This can cause the vehicle to drift off course or provide numerous small inputs to the steering system which can prematurely wear out the system. Accordingly, it is desirable to provide a steering tiller that substantially or completely eliminates the backlash in the steering tiller.

SUMMARY OF THE INVENTION

The present invention provides a steering system for a mobile platform. In one preferred embodiment, the steering system includes an input mechanism operable to receive an input from an operator of the mobile platform to move the input mechanism into a first position or a second position. The input mechanism further includes an input arm. An idler is rotatably coupled to the input, and the idler is configured to engage the input arm in the second position. At least one biasing member is coupled to at least one of the idler and input arm. The at least one biasing member is operable to resist the movement of the input mechanism into the first or second positions. A steering mechanism coupled to the input mechanism is operable upon receipt of the steering input to guide the mobile platform.

The present invention further provides a steering system for an aircraft having substantially zero, or zero, backlash including a housing operable to retain a portion of the steering mechanism. An input mechanism is operable to receive an input from an operator of the aircraft to move into a first position or a second position. The input mechanism includes an input arm. An idler is rotatably coupled to the input mechanism, and the idler is configured to engage the input arm in the second position. The steering mechanism further includes a first spring with a first end coupled to the housing and a second end coupled to the input arm to resist the movement of the input arm, and a second spring with a first end coupled to the housing and a second end coupled to the idler to resist the movement of the idler. A steering mechanism coupled to the input mechanism is operable upon receipt of the input from the operator to guide the aircraft.

In another preferred embodiment, the present invention also provides a steering system for an aircraft having substantially zero, or zero, backlash and including an input mechanism which is operable to receive an input mechanism from an operator of the aircraft to move into a first position or a second position. The input mechanism also includes an input arm. An idler is rotatably coupled to the input mechanism, and the idler is configured to engage the input arm in the second position. The steering system further includes at least one biasing member operable to resist the movement of the input mechanism into the first or second positions. A steering mechanism is operable upon receipt of the input mechanism to guide the aircraft. The steering mechanism includes a position transducer coupled to the input mechanism. The position transducer is operable to create a directional signal based on the input from the operator.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF VARIOUS EMBODIMENTS

The following description of the various embodiments is merely exemplary in nature and is in no way intended to limit the invention, its application, or uses. Although the following description is related generally to a steering system for use in a mobile platform, such as an aircraft, the system could also be potentially implemented in a marine vessel, a train or a land based motor vehicle. Thus, it will be understood that the present invention could be employed in a wide variety of applications. Therefore, it will be understood that the following discussions are not intended to limit the scope of the appended claims.

Figure 1:
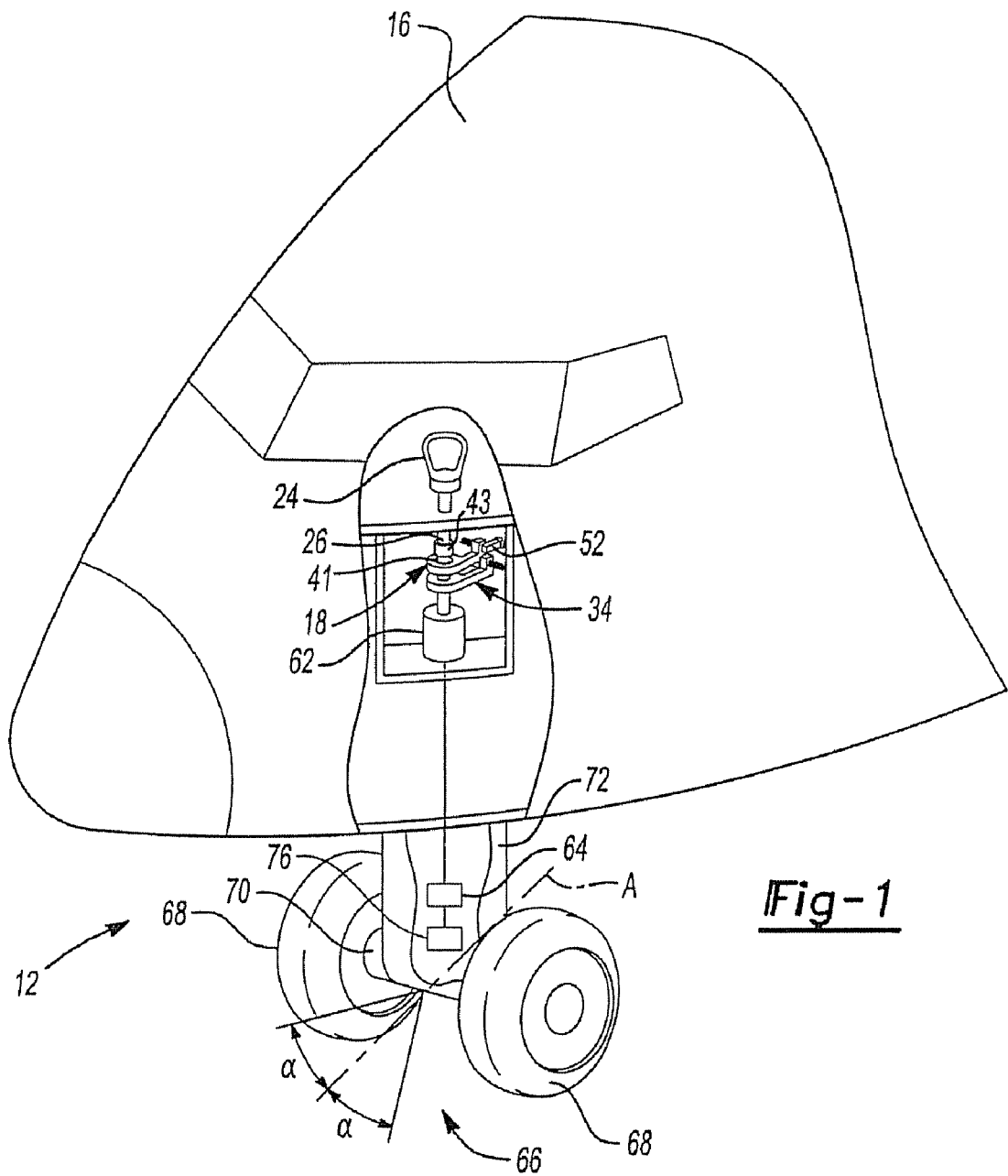
FIG. 1 is an environmental view of an aircraft employing the backlash reduction steering tiller according to various embodiments of the present invention.

With reference to FIG. 1, a steering system 10 for a mobile platform, such as an aircraft 12, is illustrated. The steering system 10 operates generally to change the direction of the aircraft 12. The steering system 10 includes an input mechanism 14, a portion of which is disposed in a cockpit 16 of the aircraft 12.

Figure 2:
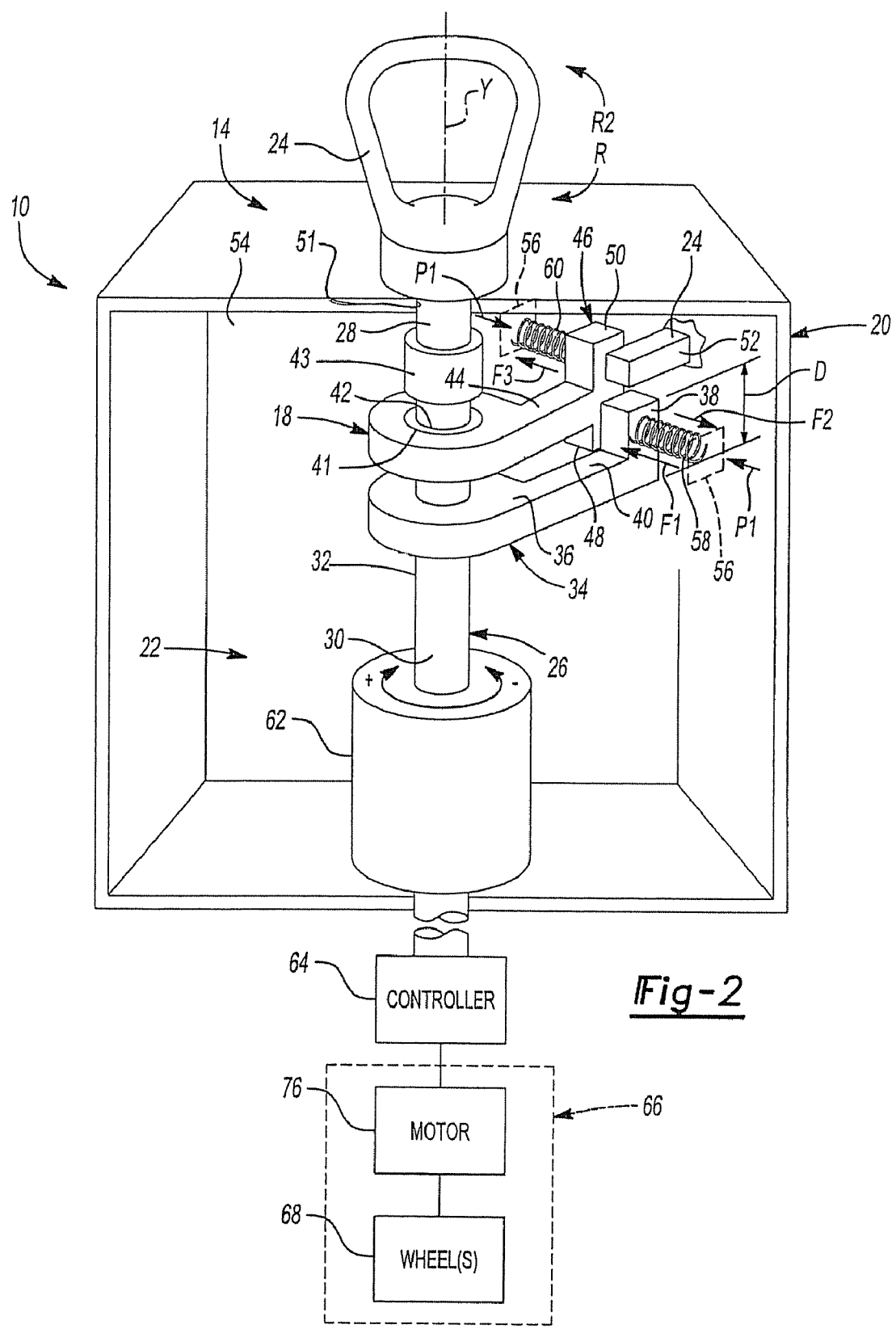
FIG. 2 is a perspective view of a zero backlash steering tiller according to a preferred embodiment.
Figure 3:
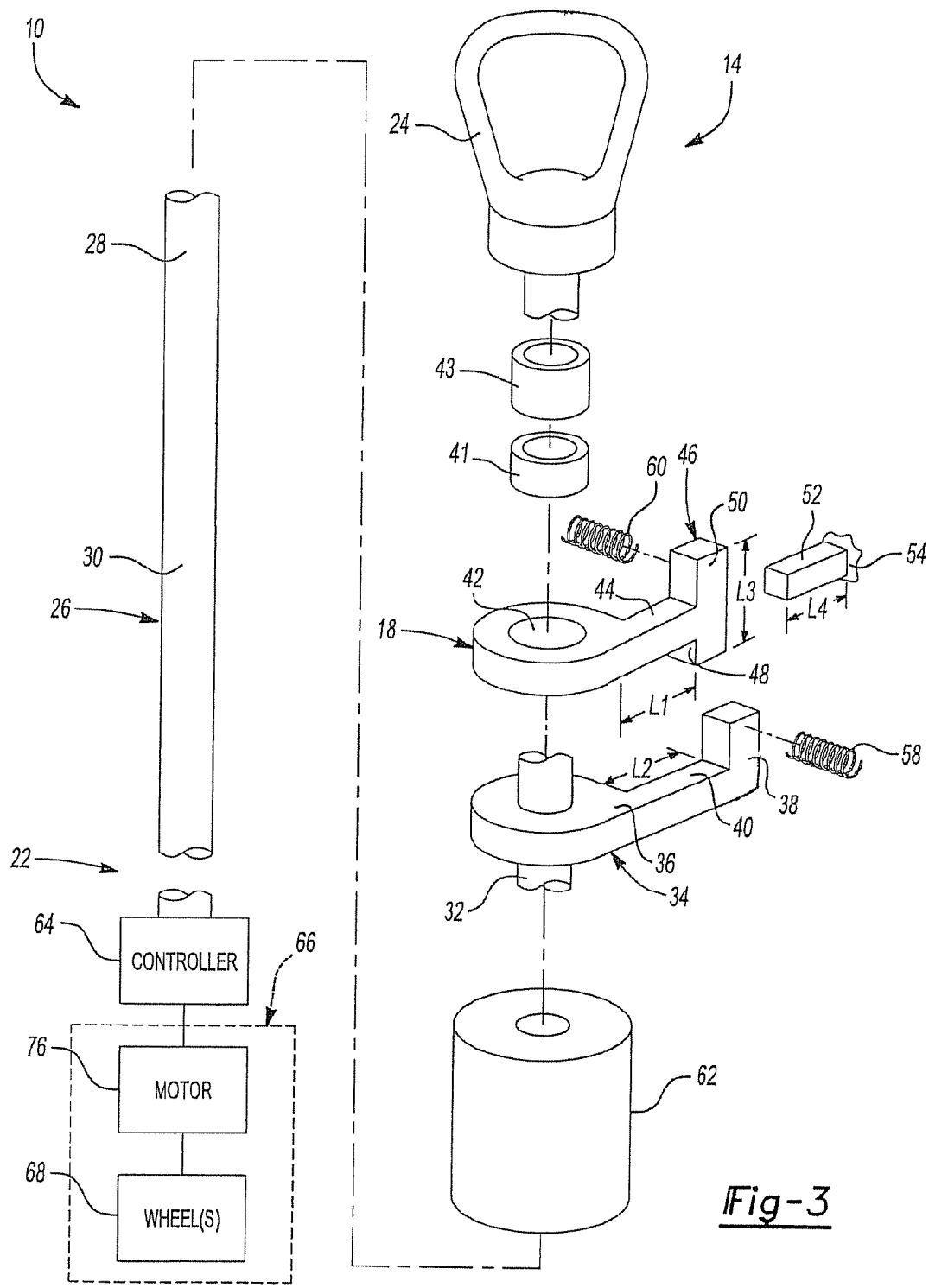
FIG. 3 is an exploded view of the backlash reduction steering tiller according to various embodiments.

Referring to FIGS. 2 and 3, the input mechanism 14 is coupled to an idler 18. A housing 20 may be disposed about the idler 18 and a portion of the input mechanism 14. The idler 18 may also be coupled to a steering mechanism 22.

The input mechanism 14 includes a user interface, such as a handle 24, coupled to an input shaft 26. Although handle 24 is illustrated as forming the graspable steering element, it will be understood that a variety of other mechanisms could be used to interface with an occupant of the cockpit 16, such as a joystick, lever, knob, or other appropriate mechanism by which an occupant of the cockpit 16 may manipulate a steering element.

The input shaft 26 includes a first end 28 coupled to the handle 24, a second end 30 coupled to the steering mechanism 22 and a central portion 32. The input shaft 26 is generally configured to rotate about a Y-axis upon receipt of an input "R" or "R2" from the occupant applied through the handle 24. The input shaft 26 further includes an input arm 34 which may be integrally formed in the central portion 32, or coupled to the central portion 32 through a post processing step, such as welding.

The input arm 34 is generally circular, but may include a protrusion 36 having a vertically extending branch 38. The protrusion 36 may be sized to enable the branch 38 to engage the idler 18. The branch 38 may extend a selected distance "D" above a surface 40 of the input arm 34 to enable the input arm 34 to contact the idler 18.

The idler 18 is also preferably generally circular in shape, with a central opening 42. The central opening 42 is generally sized to enable the idler 18 to be rotatably coupled to the input shaft 26. The idler 18 is free to rotate on the input shaft 26, typically using a bearing 41. The idler 18 could be restrained to prevent movement up or down the input shaft 26 by a collar 43 on the input shaft 26 above the input arm 34. The idler 18 may further include a neck 44 having a generally T-shaped branch 46. The neck 44 may be sized to extend a length "L1" from the input shaft 26, which may typically be equivalent to a length "L2" between the input shaft 26 and branch 38 of the input arm 34.

The T-shaped branch 46 may have a first end 48 and a second end 50. The T-shaped branch 46 may be sized with a length "L3" which is configured to enable the first end 48 of the T-shaped branch 46 to contact the branch 38 of the input arm 34 and the second end 50 of the T-shaped branch 46 to contact the housing 20 as will be described in greater detail below.

The housing 20 may include a central opening 51 to enable the input shaft 26 to pass therethrough. The housing 20 may also be configured to enclose the idler 18 and input arm 34 of the input mechanism 14, however, it will be understood that the shape and configuration of the housing 20 may vary for different applications. The housing 20 generally includes a stop 52 formed on an interior surface 54 of the housing 20. The stop 52 extends a length L4 from the interior surface 54 to act as a contact surface for the T-shaped branch 46 of the idler 18. Thus, the length L4 of the stop 52 may be any length which is required to inhibit the movement of the idler 18 beyond the stop 52. The housing 20 further includes two cavities 56 (illustrated in dashed lines for clarity) formed on the interior surface 54 for receipt of a first spring 58 and a second spring 60. The first spring 58 may be positioned to contact the input arm 34, and apply a pre-load force to the input arm 34, while the second spring 60 may be positioned within the housing 20 to contact the idler 18 and apply a pre-load force to the idler 18. Generally, the first and second springs 58, 60 are coil springs, however, any suitable biasing member could be employed, such as torsion springs which could apply torque about the input shaft 26 (not shown). The housing 20 may enclose the steering mechanism 22. The housing 20 provides a means to mount the steering mechanism 22 within the aircraft 12 and keeps foreign objects from jamming the steering mechanism 22.

The steering mechanism 22 is coupled to the second end 30 of the input shaft 26, and may, depending upon the desired configuration, be situated entirely within the housing 20. The steering mechanism 22 includes a position transducer 62, a controller 64 and a wheel assembly 66. It will be understood, however, that the position transducer 62 and controller 64 may be substituted for a mechanical linkage to a mechanical steering system, as is generally known in the art.

The position transducer 62 is generally coupled to the second end 30 of the input shaft 26. The position transducer 62 operates to convert the rotational input of the input shaft 26 to a positive or negative electrical signal, depending upon the rotation of the input shaft 26. For example, the rotation of the input shaft 26 clockwise may generate a positive electrical signal, and the rotation of the input shaft 26 counterclockwise may generate a negative electrical signal, and vice versa, however, any method of electrically distinguishing between the clockwise and counterclockwise direction could be employed. The position transducer 62 is in electrical communication with the controller 64.

The controller 64 is in communication with the position transducer 62 and the wheel assembly 66. The controller 64 is operable to convert the electrical signal received from the position transducer 62 into a desired movement for the wheel assembly 66, as will be discussed in greater detail below. It will be understood, however, that although the controller 64 is described herein as converting the electrical signal from the position transducer 62, any appropriate position detecting mechanism could be employed.

The wheel assembly 66 is in communication with the controller 64 and generally operates to guide the aircraft 12 based on the input received from the controller 64. The wheel assembly 66 may include at least one wheel 68, however, two wheels 68 are generally used in large aircraft applications. For example, the wheels 68 typically rotate about an axis 70 which may be supported by a structure 72. The structure 72 may couple the wheels 68 to a motor 76. The motor 76 may be in communication with the controller 64 to pivot the wheel assembly 66 to a desired angle α about an axis A based upon the input received from the controller 64, as will be described in greater detail below. Generally, the angle α to which the wheel assembly 66 rotates is between 65 and 75 degrees. The motor 76 may be any appropriate type of motor which is capable of pivoting the wheel assembly 66 about an axis to enable the aircraft 12 to change direction.

Referring further to FIG. 2, in order to guide or steer the aircraft 12, the operator in the cockpit 16 may apply a force "R" to the handle 24 of the input mechanism 14. Generally, prior to the application of the force "R" to the handle 24, the handle 24 is in a standard position, with the first and second springs 58, 60 each applying a pre-load force "P1" to the input arm 34 and idler 18, respectively. The force "R" applied by the occupant to the handle 24 will cause the input shaft 26 of the input mechanism 14 to rotate, which in turn causes the input arm 34 of the input shaft 26 to apply a force F2 against either the first spring 58 or the idler 18, and which also causes the idler 18 to apply a force "F3" to the second spring 60, depending upon the direction of the rotation of the input shaft 26.

For example, if the operator in the cockpit 16 applies the force R clockwise, the input shaft 26 will rotate clockwise, and the input arm 34 will apply the force "F2" against the first spring 58. Further, when the input shaft 26 rotates clockwise, the idler 18 is prevented from rotating clockwise due to the stop 52 formed on the interior surface 54 of the housing 20. Alternatively, if the operator in the cockpit 16 applies the force R counterclockwise, then the input shaft 26 will rotate counterclockwise, causing the branch 38 of the input arm 34 to apply the force "F1" to the T-shaped branch 46 of the idler 18. The application of the force "F1" from the input arm 34 will in turn cause the idler 18 to apply the force "F3" against the second spring 60.

As the input shaft 26 of the input mechanism 14 rotates, the position transducer 62 converts the rotation of the input shaft 26 into the corresponding electrical signal. For example, if the input shaft 26 is rotated clockwise by the occupant of the cockpit 16, then the position transducer 62 may generate a positive electrical signal which is then transmitted to the controller 64. Similarly, as an example, if the occupant in the cockpit 16 rotates the input shaft 26 counterclockwise, the position transducer 62 may generate a negative electrical signal which is then communicated to the controller 64. Then, depending upon the electrical signal generated by the position transducer 62, the controller 64 may signal the motor 76 to pivot the wheel assembly 66 to a desired angle α about the axis A.

After the occupant of the cockpit 16 has completed the desired maneuver of the aircraft 12, the occupant of the cockpit 16 may then rotate the handle 24 to the starting position, while allowing straightforward motion of the aircraft 12. The use of the first and second springs 58, 60 ensures that when the input shaft 26 is in the starting position, it will return to the precise starting position with no backslash or slop when the handle 24 is released. This prevents the controller 64 from receiving numerous readings from the position transducer 62 as the first and second springs 58, 60 prevent small movements of the input shaft 26 when the input shaft 26 is near the starting position. In addition, if the occupant of the cockpit 16 desires to apply a counterforce R2 in a direction opposite the force R, then it should be noted that the first and second springs 58, 60 enable the occupant of the cockpit 16 to smoothly transition through the starting position to guide the aircraft 12 in the opposite direction.

The present invention provides a steering mechanism with essentially little or no backlash, and which does not require adjustment, even if the first and second springs 58, 60 have a loss of pre-load force P1. Specifically, the use of the first and second springs 58, 60 against the input arm 34 and idler 18 serves to remove the backlash from the steering system 10. The use of the first and second springs 58, 60 also eliminates the need for adjustment to the steering system 10 to stay at zero backlash. Thus, the steering system 10 essentially forms a self-calibrating system that maintains the handle 24 at a designated "zero" position, while simultaneously removing the backlash that would otherwise be present in a convention steering system.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A steering system having reduced backlash on an aircraft, the system comprising:
    a housing operable to retain a portion of a steering mechanism;
    a user interface for receipt of an input from an operator;
    an input mechanism coupled to the user interface to receive the input from the operator of the aircraft to move into a first position or a second position, the input mechanism including an input arm and an input shaft including a first end, a second end and a central portion;
    an idler defining an opening so that the idler is rotatable on the input shaft of the input mechanism, the idler including a branch that extends from the opening to engage the input arm in the second position;
    a first spring including a first end and a second end, the first end of the first spring coupled to the housing, and the second end of the first spring coupled to the input arm to resist the movement of the input arm;
    a second spring including a first end and a second end, the first end of the second spring coupled to the housing, and the second end of the second spring coupled to the idler to resist the movement of the idler; and
    the steering mechanism being coupled to the input mechanism and operable upon receipt of the input from the operator to guide the aircraft.

2. The steering system of claim 1, wherein the housing further comprises an integrally formed stop operable to engage the idler when the input mechanism is moved into the first position.

3. The steering system of claim 1, wherein
    the first end of the input shaft is coupled to the user interface, the second end of the input shaft is coupled to the steering mechanism, the idler is rotatably coupled to the central portion and the input arm is formed on the central portion.

4. The steering mechanism of claim 3, wherein a rotation of the user interface in a first direction moves the input mechanism into the first position such that the first spring biases against the input arm and a rotation of the user interface in a second direction moves the input mechanism into the second position such that the input arm contacts the idler and the second spring biases against the idler.

5. The steering system of claim 3, wherein the user interface comprises a handle.

6. The steering system of claim 3, wherein the steering mechanism comprises:
    a position transducer coupled to the input shaft, the position transducer operable to convert the rotation of the input shaft into a directional signal;
    a wheel assembly coupled to the position transducer and the aircraft, the wheel assembly including at least one wheel rotatable about a vertical axis; and
    a controller coupled to the position transducer and the wheel assembly, the controller operable to receive the directional signal from the position transducer and pivot the at least one wheel based on the directional signal.

* * * * *